United States Patent
Kurtz et al.

(10) Patent No.: US 6,327,911 B1
(45) Date of Patent: Dec. 11, 2001

(54) HIGH TEMPERATURE PRESSURE TRANSDUCER FABRICATED FROM BETA SILICON CARBIDE

(75) Inventors: Anthony D. Kurtz, Teaneck; Alexander A. Ned, Bloomingdale, both of NJ (US)

(73) Assignee: Kulite Semiconductor Products

( * ) Notice: Subject to any disclaimer, the term of this patent is extended or adjusted under 35 U.S.C. 154(b) by 0 days.

(21) Appl. No.: 09/098,952

(22) Filed: Jun. 17, 1998

Related U.S. Application Data

(63) Continuation of application No. 08/450,108, filed on May 25, 1995, now abandoned.

(51) Int. Cl.[7] .................................................. G01L 9/06
(52) U.S. Cl. ................................................................ 73/727
(58) Field of Search .............................. 73/708, 721, 727, 73/777, 862.627; 252/521; 338/2, 4, 47; 374/185

(56) References Cited

U.S. PATENT DOCUMENTS 5,303,594 * 4/1994 Kurtz et al. ............................ 73/727

* cited by examiner

*Primary Examiner*—William Oen
(74) *Attorney, Agent, or Firm*—Duane Morris; Arthur L. Plevy

(57) ABSTRACT

A high temperature pressure transducer employing dielectrically isolated beta silicon carbide pressure sensing elements situated on a diaphragm also fabricated from beta silicon carbide. The dielectrically isolated pressure sensing elements are formed on the diaphragm in method which employs two separately fabricated wafers that are later bonded together.

19 Claims, 1 Drawing Sheet

HIGH TEMPERATURE PRESSURE TRANSDUCER FABRICATED FROM BETA SILICON CARBIDE

This is a continuation of Ser. No. 08/450,108, filed May 25, 1995, now abandoned.

FIELD OF INVENTION

This invention relates generally to semiconductor microsensor structures and more specifically, to high temperature semiconductor pressure transducers fabricated from beta-silicon carbide.

BACKGROUND OF THE INVENTION

Prior art high temperature semiconductor pressure transducers are typically made by adhesively bonding the sensing elements to a metal diaphragm or by diffusing the sensing elements into a silicon diaphragm. The devices which employ metal diaphragms generally have high temperature capability, however, the metal diaphragms have gage factors of approximately 1–2. The silicon diaphragms of the other devices exhibit a relatively large gage factor up to approximately 400° C., however, the silicon diaphragms cannot handle any significant loads at temperatures above approximately 500° C.

Higher temperature operation of pressure transducers employing silicon diaphragms has been made possible by providing a dielectric isolation between the silicon sensor network and the silicon diaphragm-like force collector. These devices are generally capable of operating at temperatures in excess of 500° C. Above 600° C., however, the silicon sensing network as well as the silicon diaphragm, undergo significant plastic deformation rendering the device useless as a pressure transducer. This problem was addressed and solved in the prior art by employing either alpha-silicon carbide or beta silicon carbide as both a sensor network and as the diaphragm. For example, see U.S. Pat. No. 5,165,283 entitled HIGH TEMPERATURE TRANSDUCERS AND METHOD OF FABRICATING THE SAME EMPLOYING SILICON CARBIDE issued to Anthony. D. Kurtz et al. and assigned to Kulite Semiconductor Products, Inc. the assignee herein. A heteroepitaxial growth process is described in this patent for growing alpha or beta silicon carbide on silicon substrates to fabricate pressure transducers capable of operating at extremely high temperatures in excess of 600° C.

The alpha silicon carbide (6H SiC) and beta silicon carbide is (3C SiC) described in U.S. Pat. No. 5,165,283, are just two of 200 different polytypes identified in SiC. Beta silicon carbide, however, has some distinct advantages over alpha silicon carbide. One advantage is that there is no limit on the size of the wafers that can be used in fabricating the pressure transducers. Another advantage is that beta silicon carbide is, overall, much easier and less time consuming to fabricate than growing alpha silicon carbide. Furthermore, beta silicon carbide is much less costly to fabricate than alpha silicon carbide.

Beta silicon carbide exhibits gauge factors of above 30 at room temperature and gauge factors of between 10–15 at 550° C. Thus, beta silicon carbide's ability to operate at temperatures above 500° C., while exhibiting basically temperature independent gage factors of 10–15 at such temperatures, and providing a 10 factor improvement in sensitivity over the metal gages, makes beta silicon carbide a very plausible material for high temperature applications. Moreover, the technology for processing beta silicon carbide in terms of metallization, etching, and patterning, has been demonstrated by the prior art in patents such as U.S. Pat. No. 5,165,283.

Although prior art semiconductor devices made from beta silicon carbide films on silicon are possible, such devices made in production quantities have a high defect density. This is due to the large thermal and lattice mismatches (8% and 20% respectively) between the beta silicon carbide and the silicon which causes poor quality p-n junctions in beta silicon carbine. Hence, attempts at providing semiconductor pressure transducers microfabricated from beta silicon carbide have been generally unsuccessful.

It is, therefore, a primary object of the present invention to provide a semiconductor pressure transducer device made from beta silicon carbide which avoids the problems associated with the prior art devices.

SUMMARY OF THE INVENTION

A high temperature pressure transducer comprising a diaphragm fabricated from beta-silicon carbide and at least one sensing element fabricated from beta-silicon carbide associated with the diaphragm. The sensing element associated with the diaphragm such that it is dielectrically isolated therefrom by an oxide layer.

The high temperature pressure transducer described above is made in accordance with a method that comprises the steps of depositing a diaphragm layer of beta-silicon carbide on a surface of a first semiconductive wafer, forming a dielectric isolation layer on the layer of beta-silicon, fabricating at least one sensing element made from beta-silicon carbide on a second semiconductive wafer, bonding the second wafer to the first wafer so that the sensing element is disposed on the dielectric isolation layer, and micromachining an aperture in the first semiconductive wafer to enable a portion of the diaphragm layer of beta-silicon transversing the aperture to deflect when a force is exerted thereon.

BRIEF DESCRIPTION OF THE DRAWINGS

For a detailed understanding of the present invention, reference should be made to the following detailed description taken in conjunction with the accompanying drawings wherein:

FIGS. 1A and 1B are cross-sectional views which depict the fabrication of the first wafer used in making the pressure transducer of the present invention;

FIGS. 2A and 2B are cross-sectional views which depict the fabrication of the second wafer used in making the pressure transducer of the present invention;

DETAILED DESCRIPTION OF THE INVENTION

The pressure transducer device of the present invention provides a solution to the poor quality p-n junctions of the prior art pressure transducers devices fabricated from beta silicon carbide. This is accomplished in the present invention by fabricating dielectrically isolated beta silicon carbide piezoresistive sensor elements on top of a beta silicon carbide diaphragm in a novel process that utilizes two separately processed wafers which are bonded together.

Figure 1A:
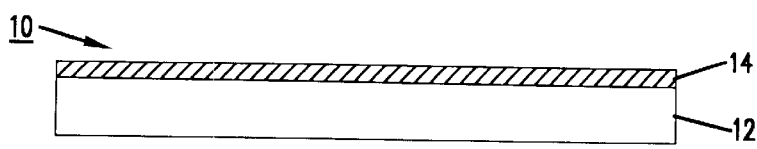

Referring to FIG. 1A, the first wafer 10 used in the pressure transducer device of the present invention, comprises a silicon substrate 12 with a diaphragm layer of beta silicon carbide 14 deposited thereon. The silicon substrate 12 is of a high resistivity n or p-type but preferably having a <100> crystal axis. The thickness of beta silicon carbide layer 14 is determined by the desired pressure range of the sensor and is generally between 3 and 20 micrometers (um) thick. The diaphragm layer 14 will eventually become the diaphragm of the device while the silicon substrate 12 will serve as a mechanical support for the diaphragm. This is accomplished by micromachining an aperture in the silicon as will be described later. The diaphragm layer 14 is deposited onto the silicon substrate 12 in a chemical vapor deposition technique (CVD). Depositing thin films of silicon carbide onto silicon substrates by chemical vapor deposition is described in U.S. Pat. No. 5,165,283 mentioned earlier.

In FIG. 1B, an oxide layer 16, which operates as a dielectric isolating layer, is formed on the diaphragm layer 14. The oxide layer 16 can be formed in a direct oxidation technique whereby the wafer is heated in a high temperature furnace to approximately 1000° C.–1300° C. and passing oxygen over the surface of diaphragm layer 14. It is well known in the art that when silicon carbide is oxidized, a stable, electronic quality silicon dioxide dielectric layer is formed on the surface thereof. Alternatively, the oxide layer 16 can be formed by converting a thin layer of the diaphragm layer 12 into a porous layer of beta silicon carbide using an electrochemical anodization technique and then converting the porous layer of beta silicon carbide to silicon dioxide. Such a technique is described in U.S. Pat. No. 5,298,767 entitled POROUS SILICON CARBIDE (SIC) SEMICONDUCTOR DEVICE issued to Joseph S. Shor et al. and assigned to Kulite Semiconductor Products, Inc. the assignee herein. The oxide layer 16 is provided for the purpose of dielectrically isolating the sensing elements to be later fabricated from the diaphragm layer 12.

Figure 2A:
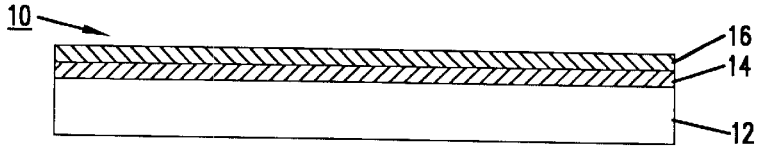

FIGS. 2A and 2B depict the processing of the second wafer 18 used in making the pressure transducer device of the present invention. In FIG. 2A, the second wafer 18 comprises a silicon substrate 20 with a sensor layer 22 of beta silicon carbide deposited thereon. The thickness of the sensor layer 22 is determined by the targeted resistance of the device since the sensor layer 22 will eventually be formed into the actual piezoresistive sensing elements of the device. In FIG. 2B, piezoresistive sensor elements 24 are fabricated by patterning the sensor layer 22 using well known patterning techniques such as electrochemical etching, reactive ion etching or plasma etching. Such techniques are described in the earlier mentioned U.S. Pat. No. 5,165,283. The piezoresistive sensor elements 24 may be patterned in a bridge pattern. Thus, when the sensor elements are mounted on the diaphragm, and the diaphragm is deflected by a force exerted thereon, the flexing stresses elongate and shorten the piezoresistors and cause them to vary their resistance according to the deflection of the diaphragm.

Figure 3:
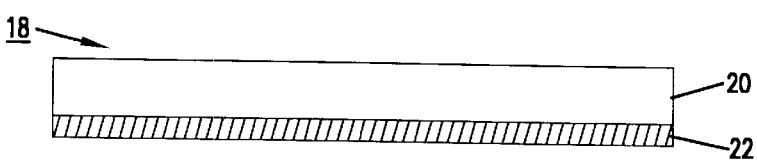
FIG. 3 is a cross-sectional view which depicts the bonding together of the first and second wafers.

In FIG. 3, the first and the second wafers 10 and 18 are bonded to one another in a fusion bonding technique. The wafers are bonded at a temperature of between approximately 900° C. and 1000° C. for approximately 5 to 10 minutes. Such a fusion bonding technique is described in U.S. Pat. 5,286,671 entitled FUSION BONDING TECHNIQUE FOR USE IN FABRICATING SEMICONDUCTOR DEVICES issued to Anthony D. Kurtz et al. and assigned to Kulite Semiconductor Products, Inc. the assignee herein. After the first and second wafers are bonded together, an appropriately chosen conductivity selective etch is used to remove the silicon substrate 20 to provide the structure shown in FIG. 4 which shows the plurality of beta silicon carbide piezoresistive elements 24 dielectrically isolated by the oxide layer 16 on the first wafer 10. Conductivity selective etching is described in copending U.S. patent application Ser. No. 08/198,511 entitled METHOD FOR ETCHING OF SILICON CARBIDE SEMICONDUCTOR USING SELECTIVE ETCHING OF DIFFERENT CONDUCTIVITY TYPES filed by Joseph S. Shor et al. on Feb. 17, 1994 and assigned to Kulite Semiconductor Products, Inc., the assignee herein. The selective etch will attack only the silicon substrate 20 of the second wafer 18 but will not etch beta silicon carbide sensor elements 24 or the oxide layer 16.

Figure 4:
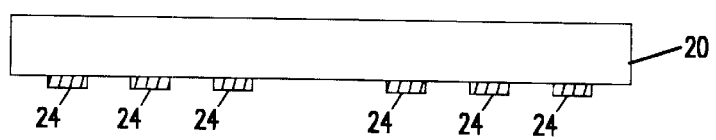
FIG. 4 is a cross-sectional view of the bonded wafers of FIG. 3 after the semiconductive substrate of the second wafer has been removed.
Figure 5:
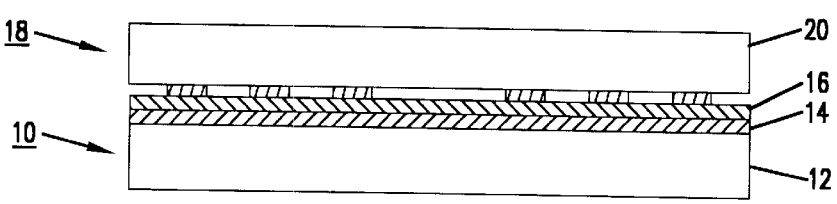
FIG. 5 is a cross-sectional view that depicts the fabrication of the contacts.

In FIG. 5, contacts 26 are fabricated on the wafer structure of FIG. 4 which serve to contact the piezoresistive sensing elements 24. The contacts 26 are fabricated by first thermally oxidizing the exposed beta silicon carbide sensing elements 24 to form a passivation layer 28 of silicon dioxide. The silicon dioxide layer 28 is approximately 100–2000 angstroms thick. Alternatively, a quartz or nitride layer can be deposited in lieu of silicon dioxide. The passivation layer 28 operates as a mask layer and removes any residue or damage caused by the etching process. Contact windows are then etched into the silicon dioxide layer 28 using a conventional buffered oxide etch. The contact windows are then filled with a contact metallization which is sputtered onto the passivation layer 28 to form the contacts 26 shown in FIG. 5. The metallization system used for the contacts 26 should be appropriate for establishing high quality contacts for high temperature applications. Examples of such metallization include titanium, tungsten or tantalum for the ohmic contact portion and platinum or gold as a conductive layer. For a more detailed discussion of contacts, see U.S. Pat. No. 5,165,283.

Figure 6:
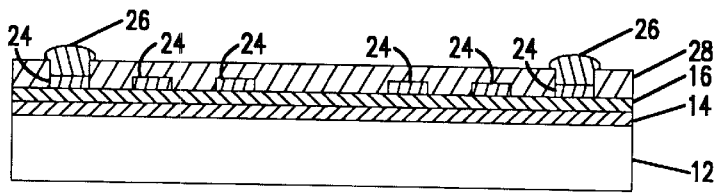
FIG. 6 is a cross-sectional view that depicts the fabrication of the diaphragm support structure.

Once the contacts have been fabricated, the diaphragm of the device is fabricated to complete the device. This is accomplished by micromachining the silicon substrate 12 using anisotropic etches to etch silicon whereby the diaphragm layer 14 acts as an etch stop. In FIG. 6, the beta silicon carbide layer 14 will act as a flexing diaphragm at 30, while the remaining portions of the silicon substrate 12 form a support rim 32 (clamp area) around the diaphragm 30, and a thick region 32 in the middle of the diaphragm 30 commonly referred to as a "boss".

The implementation of dielectrically isolated beta SiC piezoelectric sensing elements on a beta SiC diaphragm provides a novel approach to reaping the benefits of beta SiC which include higher operational temperatures that result from the higher bandwith of this material.

Pressure transducer devices made in accordance with the above described techniques are capable of operating above 500° C. even though the silicon components of the devices start to become plastic at reduced stress levels at such temperatures. However, in this particular application, the silicon will not be exposed to any significant stress levels, since most of the stress will be in the beta SiC diaphragm 30. However, the silicon will still be the limiting factor in terms of maximum temperature capability. To further increase the temperature range of operation, the diaphragm and the support areas can all be fabricated from a substrate of beta SiC using well known photoelectrochemical micromachining techniques described in the prior art.

Figure 7:
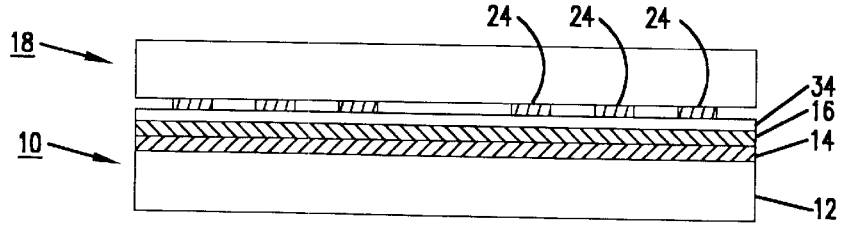
FIG. 7 is a cross-sectional view that depicts a second embodiment of the bonding technique employed in bonding the first and second wafers together.

It should be understood that the embodiments described herein are merely exemplary and that a person skilled in the art may make many variations and modifications to these embodiments utilizing functionally equivalent elements to those described herein. For example, an electrostatic bonding technique can be used to bond the first and second wafers together. Electrostatic bonding techniques are described in detail in U.S. Pat. No. 3,951,707 entitled METHOD FOR FABRICATING GLASS-BACKED TRANSDUCERS AND GLASS-BACKED STRUCTURES issued to Anthony D. Kurtz and assigned to Kulite Semiconductor Products, Inc. the assignee herein. The first and second wafers are electrostatically bonded together by depositing a glass layer 34 over the oxide layer 16 and placing the first and second wafers together as shown in FIG. 7. The glass layer 34 can be fabricated from Corning 1729 or pyrex 7740 aluminosilicate glass which is annealed at 780° C. in oxygen. The glass layer 34 and the beta SiC sensing elements 24 are then heated while simultaneously providing a small current flow through the wafers. This affects a bond between the glass layer 34 and the beta SiC sensing elements 24. After bonding, the resulting structure is processed as earlier described.

Variations and modifications such as the one described immediately above as well as others which may become apparent to those skilled in the art, are intended to be included within the scope of the invention as defined by the appended claims.

We claim:

1. A high temperature pressure transducer, comprising:
   a substrate having a first surface and a second surface;
   a diaphragm layer fabricated from beta-silicon carbide and formed over said substrate first surface;
   a dielectric layer formed over said diaphragm layer;
   at least one piezoresistive sensing element fabricated from beta-silicon carbide mounted and bonded to said dielectric layer; and
   a recess in said substrate second surface, wherein a portion of said diaphragm layer is exposed in said recess and wherein said exposed portion of said diaphragm layer forms a flexible diaphragm.

2. The pressure transducer of claim 1, wherein said substrate comprises silicon.

3. The pressure transducer of claim 1, wherein said substrate comprises beta-silicon carbide.

4. The pressure transducer of claim 2, wherein said dielectric layer comprises an oxide layer.

5. The pressure transducer of claim 4, wherein a passivation layer comprising silicon dioxide is formed over said at least one piezoresistive sensing element.

6. The pressure transducer of claim 5, wherein at least one contact is formed on said passivation layer for coupling with said at least one piezoresistive sensor element.

7. The pressure transducer of claim 5, wherein said passivation layer comprises quartz.

8. The pressure transducer of claim 1, wherein a plurality of piezoresistive sensing elements are mounted on said dielectric layer in a bridge pattern.

9. The pressure transducer of claim 4, wherein said at least one piezoresistive sensing element is further isolated from said diaphragm by a glass layer formed on said oxide layer.

10. A method for fabricating a high temperature pressure transducer comprising the steps of:
    depositing a diaphragm layer of beta-silicon carbide on the surface of a first substrate;
    forming a dielectric layer over said diaphragm layer of beta-silicon carbide;
    fabricating at least one piezoresistive sensing element on a second substrate, said at least one piezoresistive sensing element comprising beta-silicon carbide;
    mounting said at least one piezoresistive sensing element to said dielectric layer, wherein said at least one piezoresistive sensing element is dielectrically isolated from said diaphragm layer;
    removing at least a portion of said second substrate wherein said at least one piezoresistive sensing element is exposed; and
    removing a portion of said first substrate wherein a portion of said diaphragm layer is exposed and wherein said exposed portion of said diaphragm layer forms a flexible diaphragm.

11. The method of claim 10, wherein said first and said second substrate comprise silicon.

12. The method of claim 10, wherein said first substrate comprises beta-silicon carbide.

13. The method of claim 10, further comprising the steps of:
    forming a passivation layer over said at least one piezoresistive sensing element; and
    fabricating at least one contact on said passivation layer for contacting said at least one piezoresistive element.

14. The method of claim 13, wherein said step of forming said dielectric layer comprises oxidizing said beta-silicon carbide, thereby forming a layer of silicon dioxide.

15. The method of claim 13, wherein said step of forming said dielectric layer comprises:
    converting a portion of said diaphragm of beta-silicon carbide to porous beta-silicon carbide; and
    converting said porous layer to silicon dioxide.

16. The method of claim 13, wherein said step of fabricating said at least one piezoresistive sensing element comprises the steps of:
    depositing a layer of beta-silicon carbide on said second substrate;
    patterning said layer of beta-silicon carbide on said second substrate to form at least one piezoresistive sensing element.

17. The method of claim 16, wherein said step of mounting comprises fusion bonding.

18. The method of claim 17, wherein a plurality of piezoresistive sensing elements are formed on said dielectric layer in a bridge pattern.

19. The method of claim 18, further comprising the steps of:
    forming a glass layer over said oxide layer, thereby further dielectrically isolating said at least one piezoresistive sensing element from said diaphragm.

* * * * *